Oct. 15, 1968 A. M. C. C. PEETERS ETAL 3,406,258

CONTROL CIRCUIT FOR SWITCHING NETWORKS HAVING OUTPUT AVAILABILITY CHECK MEANS

Filed April 16, 1965 3 Sheets-Sheet 1

Oct. 15, 1968 A. M. C. C. PEETERS ET AL 3,406,258

CONTROL CIRCUIT FOR SWITCHING NETWORKS HAVING OUTPUT AVAILABILITY CHECK MEANS

Filed April 16, 1965 3 Sheets-Sheet 2

3,406,258
CONTROL CIRCUIT FOR SWITCHING NETWORKS HAVING OUTPUT AVAILABILITY CHECK MEANS

Andreas Michiel Cyriel Corneel Peeters, Schoten, Jan Van Goethem, Antwerp, and Jozef August Corneel Maria De Cleyn, Kapellen, Belgium, assignors to International Standard Electric Corporation Filed Apr. 16, 1965, Ser. No. 448,704
7 Claims. (Cl. 179—18)

ABSTRACT OF THE DISCLOSURE

Switching network including a plurality of incoming junctions connected through a plurality of first group selectors, links, and second group selectors to a plurality of outgoing junctions. The connection is made in such a manner that each incoming junctions has access to all of the outgoing junctions. The outgoing junctions are arranged in a plurality of sets. The network includes a control circuit which operates to check the availability of the outgoing junctions of the wanted set, and the availability of the links giving access to these outgoing junctions. The control circuit then indicates that there is at least one available outgoing junction in the wanted set. Thus, the circuitry provides means for precluding the necessity of having the control circuit check all the individual outgoing junctions for availability.

This invention relates to control circuits switching networks and in particular to such a network serving to connect one of a plurality of inputs to one of a plurality of outputs.

The outputs are arranged in a plurality of sets. The switching networks are adapted to establish individual connections between one of said inputs and an output of a wanted one of said sets through an available link. The links are constituted by two cascaded switches belonging to two cascaded switching stages. A control circuit individual to each set indicates that it is the wanted set, that the sets include one available output and that on a link giving access to said available output is also available.

Such networks are already known to those skilled in the art. The control circuit thereof successively checks the availability of all individual outputs together with that of the links giving access to these outputs. This checking operation is understandably time consuming. The checking operation is performed under the control of a rotary switch which has a number of positions equal to the number of outputs to be checked. As the outlet capacity of such switches is limited, e.g. 100, it is clear that when the number of outlets is high, e.g. in a large telephone exchange, a substantial number of control circuits is required.

It is therefore an object of the invention to provide a switching network of the above type, but which does not present these drawbacks.

More specifically, a general object of the invention is to realize a system using only one or a restricted number of such path-finding control circuits in a novel manner.

The switching network according to the invention is characterized in that said control circuit only checks the availability of the outputs of said wanted set and of the links giving access to these outputs, and indicates that there is at least one available output in said wanted set.

Another characteristic of the invention is that said plurality of outputs are also divided into a plurality of second sets and that the control circuit checks the availability of outputs in the wanted first set successively for all the second sets.

Still another characteristic of the invention is that said control circuit includes a first counter controlling the checking operation of the availability of the outputs in the wanted first set successively for all the second sets.

Yet another feature of the invention is that it includes only a single one of said control circuits.

The above mentioned and other objects and features of the invention will become more apparent and the invention itself will be best understood by referring to the following description of embodiments taken in conjunction with the accompanying drawings wherein.

Figure 3:
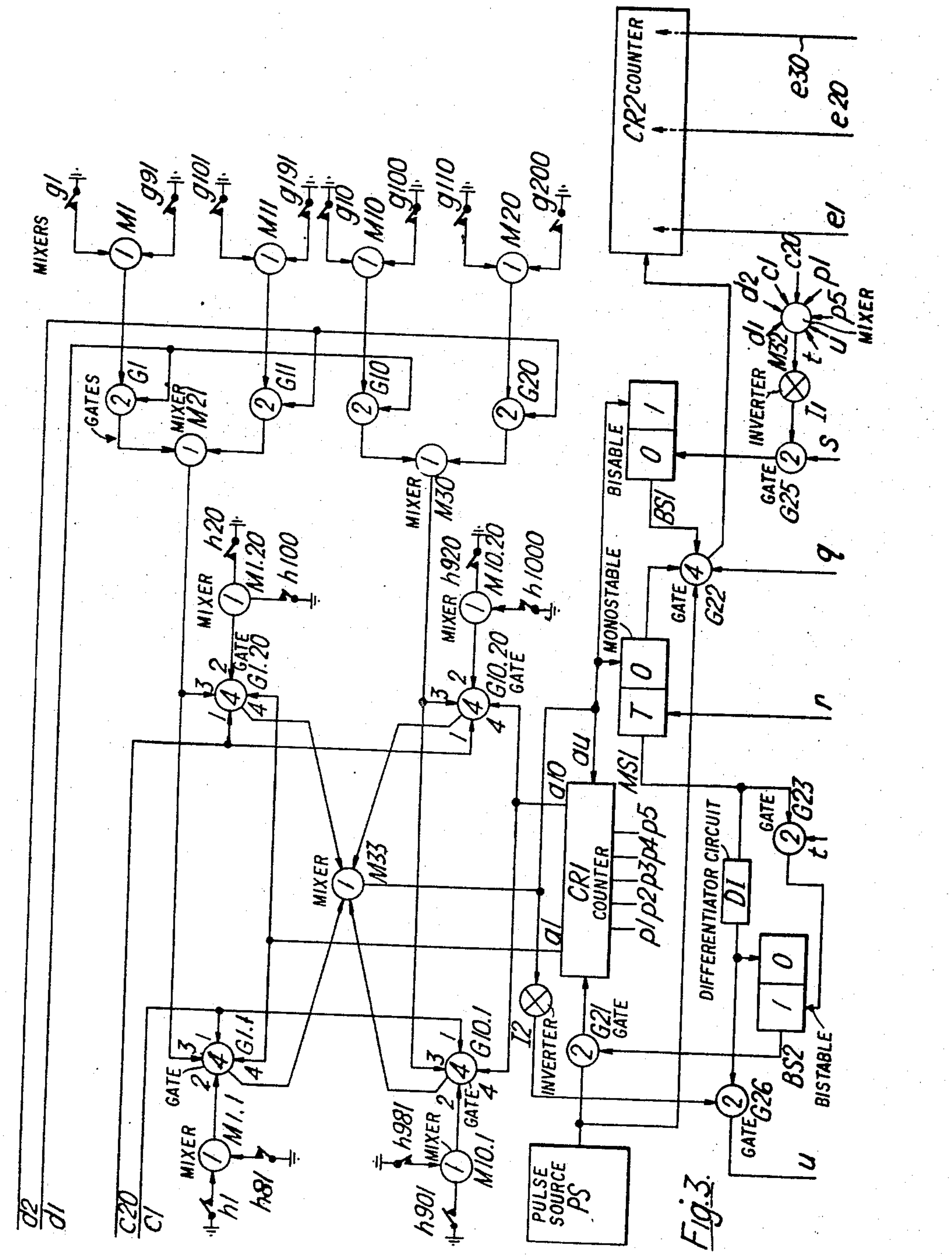

FIG. 3 schematically represents the control circuit.

Figure 1:
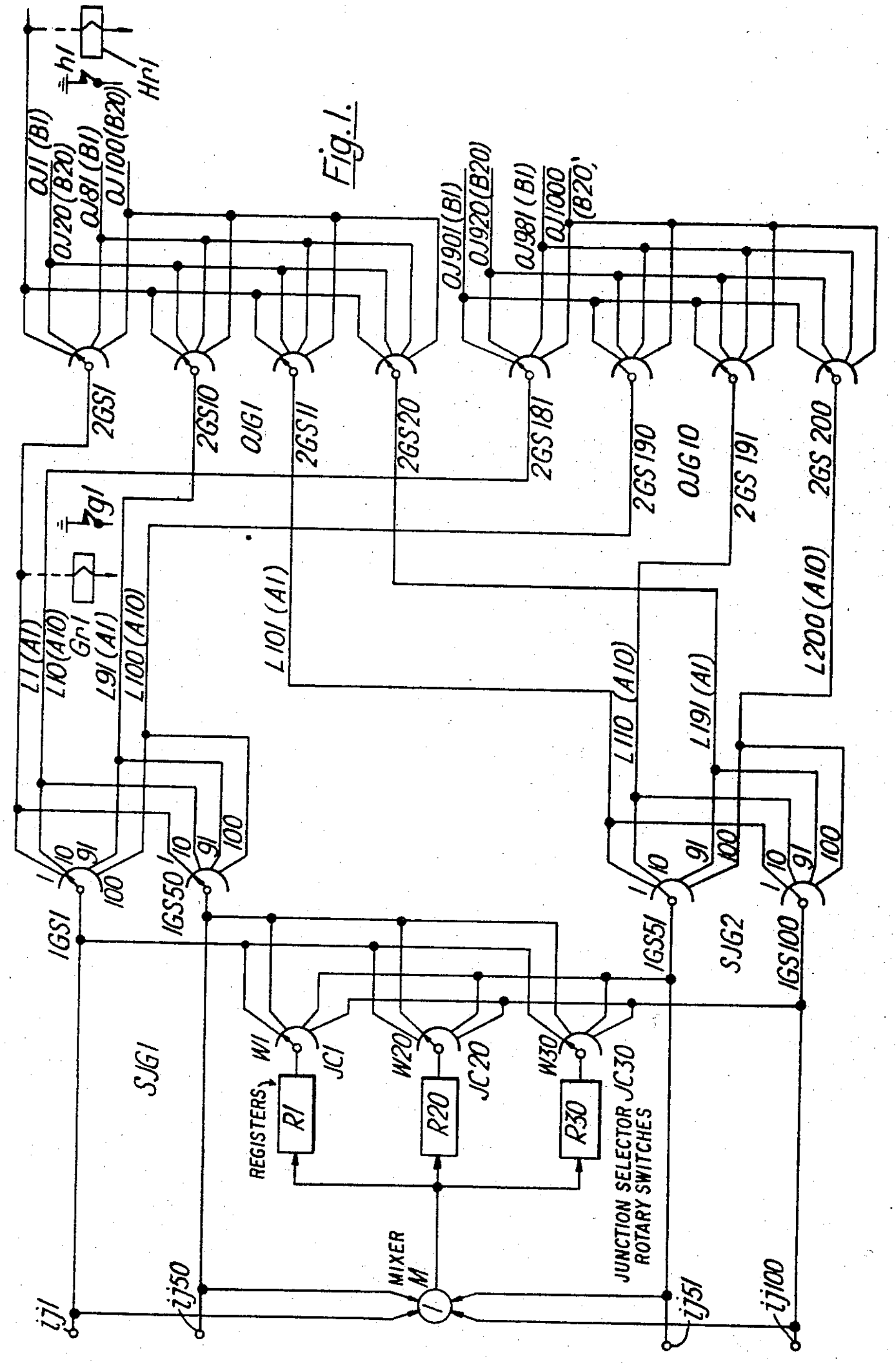
FIG. 1 is a schematic view of a switching network according to the invention without the control circuit.

Principally referring first to FIG. 1, the switching network includes two cascaded switching stages. The first stage has 100 inlets which are constituted by the incoming junctions *ij*1 to *ij*100 and 200 outlets which are served by the links L1 to L200. The second stage has 200 inlets which are served by the same link L1 to L200 and 1000 outlets which are constituted by the outgoing junctions *oj*1 to *oj*1000. A relay having a single break contact is associated with each link. The condition of the contact is indicative of the availability or non-availability condition of the link. That is, the link L1 is associated with the relay G*r*1 with a break contact *g*1. This relay being operated and released when the link L1 is busy and free respectively. Likewise, a relay is associated with each outgoing junction. The relay has a single break contact, the condition of which is indicative of the availability or non-availability condition of the junction. Thus, the outgoing junction *oj*1 has associated to it the relay H*r*1 with a break contact *h*1, this relay is operated and released when the outgoing junction *oj*1 is busy and free respectively.

Each incoming junction, *ij*1 to *ij*100, has access to each outgoing junction *oj*1 to *oj*1000. The incoming junctions *ij*1 to *ij*100 are coupled to the inlets of 100 first group selector rotary switches 1GS1 to 1GS100 respectively.

The 50 first group selector rotary switches 1GS1 to 1GS50 constitute a first incoming junction group SJB1 since the outlets L1 to L100 of these switches are multipled. The 50 first group selector rotary switches 1GS51 to 1GS100 constitute a second incoming junction group IJG2 since the outlets L101 to L200 of these switches are also multipled. The incoming junctions of the group SJG1 are characterized by a first characteristic potential, whereas the incoming junctions of the group IJG2 are characterized by a second characteristic potential.

In a classical way, which is therefore not shown in detail, the incoming junctions *ij*1 to *ij*100 are coupled to the input of a mixer M, the output lead of which is coupled to the 30 identical register circuits R1 to R30 which are connected to the inlets of the junction selector rotary switches JC1 to JC30 via the wirings *w*1 to *w*30 each comprising a plurality of conductors. More particularly, the output lead of the mixer M is coupled in the register circuits R1 to R30 to the starting circuits of these rotary switches JC1 to JC30, the outlets of which are connected in multiple to the incoming junctions *ij*1 to *ij*100.

The outlets L1 to L100 of the first incoming junction group IJG1 are arranged in ten groups, A1 to A10, each characterized by a particular corresponding phase and comprising ten outlets, e.g. the group A1 comprises the outlets L1, L11, L21 . . . L91 which are connected to the inlets of the second group selector rotary switches 2GS1 to 2GS10 respectively; the group A10 comprises the outlets L10, L20, L30 . . . L100 which are connected to the inlets of the second group selector rotary switches 2GS181 to 2GS190 respectively. In an analogous manner, the outlets L101 to L200 of the second incoming junction group IJG2 are also arranged in ten groups, A1 to A10, each comprising ten outlets and characterized by the same characteristic phases as the corresponding groups of IJG1. The links of the latter groups A1 to A10 are connected to the inlets of the second group selectors 2GS11 to 2GS20 . . . 2GS191 to 2GS200 respectively. It should be noted that the above characteristic phases are only connected to the respective links when the latter are free.

The second group selector rotary switches are arranged in ten groups OJG1 to OJG10, called outgoing junction groups, and the 100 outlets of the twenty rotary switches of each group are multipled and constitute 100 outgoing junctions. The 100 outlets of each of these outgoing junction groups QJG1 to OJG10 are arranged in twenty subgroups or directions B1 to B20, each characterized by a particular phase and comprising five outgoing junctions, e.g. the subgroup or direction B1 of the group OJG1 comprises the outgoing junctions *oj*1, *oj*21, *oj*41, *oj*61, *oj*81; the subgroup or direction B20 of the same group OJG1 comprises the outgoing junctions *oj*20, *oj*40, *oj*60, *oj*70, *oj*100.It should be noted that the above characteristic phases are also only connected to the respective outgoing junctions when the latter are free.

As mentioned above, the register circuits R1 to R30 are coupled to the junction chooser rotary switches JC1 to JC30 via the wirings *w*1 to *w*30 respectively. Since these register circuits are identical, only the register circuit R20, which is coupled to the junction chooser rotary switch JC20 via the wiring *w*20, will hereinafter be described in detail, referring principally to FIG. 2.

The wiring *w*20 includes the input leads *m*20, *n*20, and *o*20. The input lead *n*20 is coupled to the input of the prefix registering circuit PXRC20 which is adapted to store the prefix, of the called subscriber's number, which is received from a calling exchange via one of the incoming junctions *ij*1 to *ij*100 and the junction chooser rotary switch JC20. The output of the circuit PXRC20 is coupled to the input of the first translator circuit TR1.20 which is adapted to transform the stored prefix into one of twenty characteristic phases or positions, each of which is indicative of a wanted subgroup among the above enumerated subgroups B1 to B20. This one phase then appears at the output of the translator circuit TR1.20 which is coupled to the first input 1 of the phase comparator circuit PC20, which in any well known manner, is adapted to compare the characteristic phases of the outgoing junctions *oj*1 to *oj*100, the latter characteristic phases being applied to the second input 2 of the phase comparator PC20 via the lead O20, the junction selector rotary switch JC20, a first group selector rotary switch and a second group selector rotary switch.

The output of the circuit PXRC20 is also coupled to the input of a classical second translator circuit TR2.20 which is provided with twenty output leads 1 to 20 coupled with the common control circuit CC and which is adapted to activate a single one of these output leads in response to the prefix applied at its input. The input lead *m*20 is coupled to the input of the junction group identifying circuit JGIC20 which is adapted to identify and register the identity of the calling incoming junction. This circuit JGIC20 is any well known static potential comparator provided with two outputs. The outputs are coupled with a control circuit CC and are activated when the seized calling incoming junction belongs to the group SJG1 and SJG2 respectively.

A third translator circuit TR3.20 is adapted to translate the 2-out-of-5 binary code applied to its five inputs in one of the above 10 phases characteristic for the groups A1 to A10. These five inputs are coupled with the control circuit CC, where as the output of this third translator circuit is coupled to the third input 3 of the phase comparator PC20 which is also adapted to compare, as will be explained later, the characteristic phase applied to its third input successively with the characteristic phases connected to the links L1 to L20. The latter characteristic phases being applied to the second input 2 of the phase comparator PC20 via the lead O20, the junction selector rotary switch JC20 and a first group selector rotary switch.

The register circuit R20 further includes a classical relay V20*r* which is operated in any well known manner when this register has been connected to a calling incoming junction. The relay V20*r* has a make contact *v*20 which is connected to ground on one side and on the other side coupled to the control circuit CC via a break contact *ok*20.1 of a relay O*k*20*r*, the winding of the connecting relay X20*r* and the output lead E20. The relay X20*r* is provided with 29 make contacts *x*20.1 to *x*20.29. The two outputs of the junction group identifying circuit JGIC20 are connected to the output leads *d*1.20 and *d*2.20, via the make contacts *x*20.1 and *x*20.2 respectively, whereas the twenty outputs of the second translator circuit TR2.20 are connected to the output leads *c*1.20 to *c*20.20 via the make contacts *x*20.3 to *x*20.22 respectively. The five input leads of the third translator circuit TR3.20 are connected to the input leads *p*20.1 to *p*20.5 via the make contacts *x*20.23 to *x*20.27 respectively whereas the make contact *x*20.28 is connected on the one hand to ground and on the other hand to the output lead *t*20. The make contact *x*20.29 is connected on the one hand to the 1-input of the bistable device BS3.20 and on the other hand to the lead *u*20. The make contact *v*20 is also connected to the output lead *q*20 and to one input of the two-input coincidence gate G24, the other input of which is connected to the output lead *e*20 through an inverter I20. The output of this coincidence gate G24 constitutes the output lead *r*20. The relay O*k*20*r* is operated, when information from the control circuit CC has been correctly registered in the register circuit R20. A ground is connected to the output lead *s*20 via the make contact *ok*20.2.

The corresponding leads of the register circuits R1 to R30 namely *d*1.1 to *d*1.30; *d*2.1 to *d*2.30; *c*1.1 to *c*1.30 . . . *c*20.1 to *c*20.30; *p*1.1 to *p*30.1 . . . *p*1.5, to *p*30.5; *t*1 to *t*30, *u*1 to *u*30, *r*1 to *r*30 and *s*1 to *s*30 are connected to the leads *d*1; *d*2; *c*1 to *c*20; *p*1, to *p*5; *t*; *u*; *r* and *s* which are connected, together with the output leads *e*1 to *e*30, to the control circuit CC. The output leads *q*1 to *q*30 constitute the inputs of the mixer M31 the output *q* of which is also connected to the control circuit CC.

Principally, referring to FIG. 3, the control circuit CC includes a matrix of 200 four-input coincidence gates which are arranged in twenty columns and ten rows comprising the gates G1.1 to G1.20 . . . G10.1 to G10.20 respectively. The first inputs 1 of the gates of the first to the twentieth column are connected to the above output leads *c*1 to *c*20 respectively. The second inputs 2 of the gates G1.1 to G10.20 are connected to the respective outputs of the mixers M1.1 to M10.20, the mixers of a same row being associated to the outgoing junctions of a same group of outgoing junctions (OJG1 to OJG10) and the mixers of a same column being associated to the outgoing junctions of the same subgroup (B1 to B20), e.g. the 5 inputs of the mixer M1.1 are connected to ground via the respective break contacts *h*1, *h*21, *h*41, *h*61, *h*81 of the five H*r* relays associated to the outgoing junctions of the group OJG1 and belonging to the direction B1; the 5 inputs of the mixer M10.20 are connected to ground via the respective break contacts *h*920, *h*940, *h*960, *h*980, *h*1000 of the five H*r* relays associated to the outgoing junctions of the group OJG10 and belonging to the subgroup B20.

The third inputs 3 of the gates of the first to the tenth rows of the above matrix are coupled to the outputs of the two-input mixers M21 to M30 respectively.

The first inputs of these mixers are connected to the respective outputs of the ten two-input coincidence gates G1 to G10, the one inputs of which are connected to the above output lead *d*1 and the other inputs of which are connected to the respective outputs of the ten mixers M1 to M10. These mixers are conditioned by the availability and non-avaliability condition of the links belonging to SJG1 and giving access to the groups OJG1 to OJG10 respectively e.g. the 10 inputs of the mixer M1 are connected to ground via the respective break contacts *g*1, *g*11 . . . *g*91 of all the G*r* relays associated to the links which give access to output junction group OJG1 and which may be reached via first group selectors 1GS1 to 1GS50. The 10 inputs of the mixer M10 are connected to ground via the respective break contacts *g*10, *g*20 . . . *g*100 of the G*r* relays which give access to output junction group OJG10 and which may be reached via first group selectors 1GS1 to 1GS50.

The second inputs of the mixers M21 to M30 are connected to the respective outputs of the ten two-input coincidence gates G11 to G20. The one inputs of which are connected to the above output lead *d*2 and the other inputs of which are connected to respective outputs of the mixers M11 to M20. These mixers are conditioned by the availability and non-availability condition of the links belonging to input junction group IJG2 and giving access to the groups OJG1 to OJG10 respectively. That is, the 10 inputs of the mixer M11 are connected to ground via the respective break contacts *g*101, *g*111 . . . *g*191 of the G*r* relays associated with the links which give access to group OJG1 and which may be reached via groups IGS51 and IGS100. The 10 inputs of the mixer M20 are connected to ground via the respective break contacts *g*110, *g*120 . . . *g*200 of the G*r* relays associated to the links which give access to groups OJG10 and which may be reached via groups 1GS51 to 1GS100.

The fourth inputs 4 of the gates included in the first to the tenth rows of the above matrix are connected to the respective output leads *a*1 to *a*10 of the 10-condition counter CR1. These output leads *a*1 to *a*10 being successively activated when the counter is stepped from its first to its tenth condition. The counter CR1 is provided with 5 output leads which are connected to the above mentioned leads *p*1 to *p*5 respectively.

The input of the counter CR1 is connected to the output of a pulse source PS via the two-input coincidence gate G21 the second input of which is connected to the 1-output of the bistable device BS2. The 1-input of this bistable device BS2 is connected to the output of the two-input coincidence gate G23. The one input of gate G23 is connected to the output lead *t* and the other input is connected to the 1-output of the monostable device MS1 having a time constant T. The T output of the monostable device MS1 is connected to the 0-input of the bistable device BS2 via differentiator circuit D*i* which is capable of differentiating negative steps. The 0-input of the monostable device MS1 is connected to the output of the mixer M33, the inputs of which are connected to the outputs of the gates G1.1 to G10.20 of the matrix. The output of the mixer M33 is also connected to the transfer authorization input *au* of the counter CR1. The information stored in this counter appears on the output leads *p*1 to *p*5 when this authorization input is activated. The T-input of the monostable device MS1 is connected to the output lead *r*. The output of the pulse source PS and the 0-output of the monostable device MS1 are connected to two inputs of the four-input coincidence gate G22, the other inputs of which are connected to the above output lead *q* of the mixer M31 and to the 0-output of the bistable device BS1 respectively. The 0-output of the bistable device BS1 is connected to the output lead of the two-input coincidence gate G25, whereas the 1-input of this bistable device is connected to the output of the mixer M33. The one input of gate G25 is connected to the output lead *s*, whereas its other input is connected to the output of the mixer M32 via the inverter I1. This mixer M32 is conditioned by the output leads *d*1, *d*2, *c*1 to *c*20, *p*1 to *p*5, *t* and *u*. The output of the four-input coincidence gate G22 is connected to the input of the 30-condition counter CR2 the 30 inputs of which are connected to the above output leads *e*1 to *e*30 of the register circuits R1 to R30.

The output of the mixer M33 is also connected to one input of the two-input coincidence gate G26 via the inverter I2, whereas the other input of the latter gate G26 is connected to the output of the differentiator circuit D*i*. The output of the gate G26 constitutes the above lead *u*.

Figure 2:
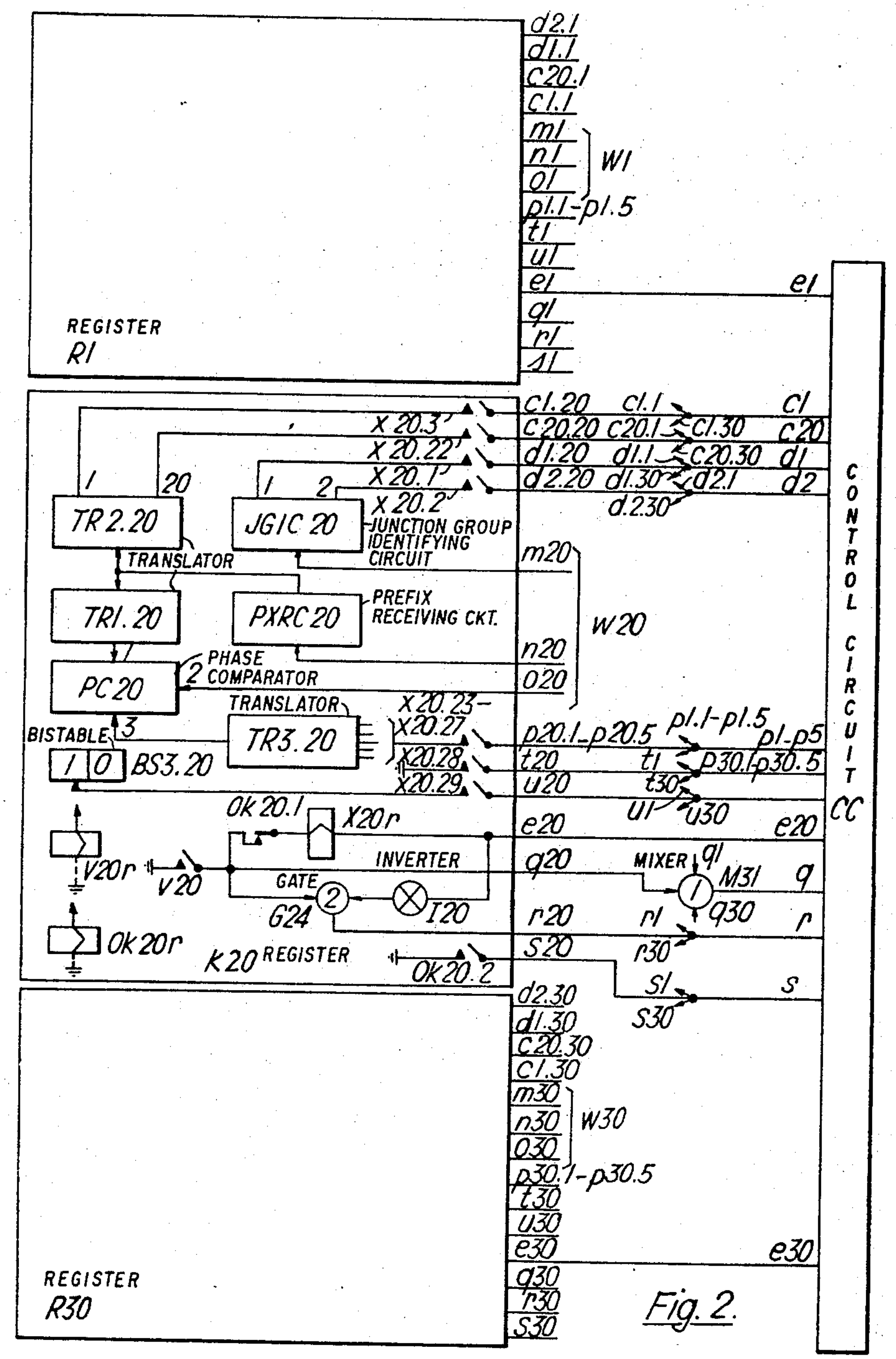
FIG. 2 shows in block diagram form the interconnection scheme of the register circuits and the control circuit.

Referring to the FIGURES 1 to 3, the operation of the system will be described in detail hereinafter. More specifically, how a calling incoming junction, such as *ij*1, is connected to an outgoing junction giving access to a particular subgroup B1 will be described.

It is assumed that all the elements are initially in the conditions shown. When the incoming junction *ij*1 is in the calling condition, a starting signal is applied to the register circuits R1 to R30 via the mixer M. Due to the starting signal, the junction selector rotary switches JC1 to JC30 simultaneously hunt for the calling junction *ij*1. In a classical way, only one of these rotary switches, e.g. JC20, is stopped on the calling incoming junction and the associated register circuit R20 is connected to this junction via the leads *m*20, *n*20 and O20 of the wiring *w*20. The lead *m*20 is connected to junction group identifying circuit JGIC20, the lead *n*20 is connected to the prefix registering circuit PXRC20 and the lead O20 is connected to the potential comparator PC20.

The JGIC20 indentifies the junction group to which the incoming junction *ij*1 belong and since this is the group IJG1 the output lead 1 of the JGIC20 leading to the contact *x*20.1 is activated. The prefix of the called subscriber's number is received in the PXRC20 and applied to the translator circuits TR1.20 and TR2.20. In the translator circuit TR1.20 this prefix is translated into one out of twenty characteristic positions corresponding to the subgroups B1 to B20 indicating over what direction the called subscriber may be reached. It is supposed that this position corresponds to the direction B20.

In the translator circuit TR2.20 the prefix is translated in a characteristic DC potential so as to activate a single one of the twenty output leads 1 to 20 of this circuit. In the present case, the twentieth output lead 20 of the translator circuit TR2.20 is activated. Due to the register circuit R20 being seized, the relay V20*r* thereof is energized closing its make contact *v*20. Consequently, the output *q* of the mixer M31 is activated so that the pulse source PS is able to supply pulses to the counter CR2 via the gate G22. Also the one input of the two-input coincidence gate G24 is activated.

When the counter CR2 is stepped its output leads *e*1 to *e*20 are successively connected to a battery. For instance, at the moment this counter CR2 reaches its twentieth condition the output lead *e*20 is connected to a battery due to which the relay X20*r* starts operating and the other input of the gate G24 is activated via the inverter I20. The output lead *r*20 of the gate G24 and hence the output *r* are both activated due to which the monostable device MS1 is triggered to its unstable condition for a period T, thus blocking the gate G22. The counter CR1 is thus stopped in the twentieth position. It should be noted that if during the stopping of the counter CR2, another *e* lead other than *e*20 is found to be activated, the counter CR2 is stopped in the corresponding position. When the monostable device MS1 is triggered, the one input of the coincidence gate G23 is also activated. The other input of this gate is activated when the relay X20.*r* has closed its make contacts *x*20.1 to *x*20.29. When the make contact *x*20.28 is closed, the output lead *t* is activated so that the bistable device BS2 is triggered in its 1-condition. When the make contacts *x*20.1 to *x*20.27 are closed, the output leads of the junction group identifying circuit JGIC20 and of the translator circuit TR2.20 are connected to the input leads *d*1, *d*2 and *c*1 to *c*20 of the control circuit CC, whereas the output leads *p*1 to *p*5 are connected to the inputs *p*20.1 to *p*20.5 of the translator circuit TR1.20. Since the output leads 1 and 20 of JGIC20 and TR2.20, which are connected to the contacts *x*20.1 and *x*20.22 respectively, have been activated, the leads *d*1 and *c*20 are also activated. By the activation of the lead *d*1 the one inputs of the gates G1 to G10 are activated and by the activation of the lead *c*20, all the first inputs 1 of the gates G1.20, to G10.20 are activated.

When the make contact *x*20.29 is closed, the 1-input of the bistable device BS3.20 is connected to the output *u* of the gate G26. Due to the bistable device BS2 being in its 1-condition, the pulse source PS is able to supply pulses to the counter CR1. Thus the fourth inputs of the gates G1.1 to G10.20 are successively activated so that when one of the outgoing junctions having access to the direction B20 and one of the links L1 to L100 are simultaneously available, one of the gates G1.20 to G10.20 is activated. It is supposed that at the moment the counter CR1 is in its tenth condition, the output of the gate G10.20 is activated. This means that one of the outgoing junctions O*j*920, O*j*940, O*j*960, O*j*980 and O*j*1000 giving access to the subgroup B20 is available and that this outgoing junction may be reached via one of the available links L10, L20, L30 . . . L100 belonging to the group A10. Due to the output of the gate G10.20 being activated, the output of the mixer M33 is also activated so that the monostable device MS1 is reset to its 0-condition. Due to this, one input of the gate G22 is activated and the differentiator circuit D*i* produces a pulse which resets the bistable device BS2 to its 0-condition so that the gate G21 is blocked and hence the stepping of the counter CR1 is stopped. Also the bistable device BS1 is triggered in its 1-condition due to which the other input of the gate G22 is deactivated so that the counter CR2 remains in the condition attained. Finally, also the authorization input *au* of the counter CR1 is activated so that 2 of the five output leads *p*1 to *p*5 of the counter CR1 are activated. That is, a 2-out-of-5 code indicative of the group A10 is transferred via the output leads *p*1 to *p*5, the output leads *p*20.1 to *p*20.5 and the closed make contacts *x*20.23 to *x*20.27 to the five inputs of the translator circuit TR3.20 of the register circuit R20. When this transfer has been correctly performed, the relay O*k*20*r* in the register circuit R20 is energized. Due to the opening of the break contact *ok*20.1 the relay X20*r* is released and by the closure of the make contact *ok*20.2 the one input of the coincidence gate G25 is activated. When the relay X20*r* has opened, all its make contacts *x*20.1 to *x*20.29 all the output leads *d*1, *d*2, *c*1 to *c*20, *p*1 to *p*5, *t* and *u* are disconnected from the control circuit CC and deactivated so that the output of the inverter I1 and hence the other input of the coincidence gate G25 are then activated. Consequently, the output of the latter gate G25 is activated so that the bistable device BS1 is reset to its 0-condition. Consequently, the pulse source PS is again able to supply pulses to the counter CR2 which is stepped. Responsive to the stepping, the battery is removed from the lead *e*20 and a battery is successively connected to the output leads *e*21, *e*22, etc.

It should be noted that when the output of the differentiator circuit D*i* is activated, after the output of the mixer M33 has been activated, the output of the gate G26 remains deactivated due to the presence of the inverter I2. In other words, the output *u* of the gate G26 remains deactivated when the output of the mixer M33 is activated during the maximum time interval T that the counter CR1 is stepped.

In the translator circuits TR1.20 and TR3.20 are now stored, the phases corresponding to B20 and A10 respectively. After the relay O*k*20*r* has been energized, the first group selector rotary switch 1GS1 is operated in a classical way not shown and the phase corresponding to A10 and stored in the translator circuit TR3.20 is successively compared, by the phase comparator circuit PC20, with the characteristic phases connected to the links L1 to L100 when these links are free. When a free link connected to a phase corresponding to A10, e.g. L10, is found the phase comparator PC20 stops the junction selector rotary switch JC20 which thus connects the calling incoming *ij*1 to the link L10. The second group selector 2GS181 connected to this link L10 is then operated. The phase corresponding to B20 and stored in the translator circuit TR1.20 is successively compared, by the phase comparator circuit PC20, with the characteristic phases connected to the outgoing junctions *oj*901 to *oj*1000. When a free outgoing junction connected to a phase corresponding to B20, e.g. *oj*920, is found the phase comparator PC20 stops the second group selector 2GS181. Thus, the link L10 is connected to the outgoing junction *oj*920, so that a connection is established between *ij*1 and *oj*920, giving access to the direction B20, via 1GS1 and 2GS181.

In the above described example, it has been supposed that during the maximum stepping time interval T of the counter CR1 a free outgoing junction together with a free link giving access thereto have been found i.e. the output of the mixer M33 has been activated before the end of this time interval T. If this is not so, the output of the mixer M33 remains deactivated so that the monostable device MS1 is automatically reset to its 0-condition after the time interval T has elapsed. In this case, the output of the gate G26 is activated and the bistable device BS3.20 in the register circuit R20 is triggered in its 1-condition thus indicating that no outgoing junction in the wanted subgroup together with a free link giving access thereto has been found.

While the principles of the invention have been described above in connection with specific apparatus, it is to be clearly understood that this description is made only by way of example and not as a limitation on the scope of the invention.

We claim:

1. Control circuits for switching networks having of inputs and a plurality of outputs,
  said outputs arranged in a plurality of sets,
  link means for connecting each of said inputs with any of said outputs,
  said link means comprising a plurality of cascaded switches arranged in an input switching stage cascaded with an output switching stage,
  a single control circuit operated responsive to address signals received over said inputs for determining the wanted one of said sets,
  means for providing parallel signals to said control circuit to simultaneously indicate the availability of said outputs in said wanted set and the availability of said links having access to said wanted set,
  means in said control circuit operated responsive to said parallel signals for determining the availability of said output in said wanted set and for determining the availability of the links giving access to said wanted set,
  means in said control circuit operated responsive to said determinations for indicating at least one available output in said wanted set, and
  means responsive to said indication of said available output for connecting said input over which said address signals were received and said available output and said available links.

2. The switching network of claim 1 wherein said output switching stage is arranged in switch sets, means for coupling each of said outputs of said output sets to each of said switch sets and means in said control circuit for checking the availability of said outputs in the wanted output sets successively for all of said switch sets.

3. The switching network of claim 2 wherein said control circuit includes a first counter for controlling the checking of the availability of the outputs in the wanted output set successively for all of the switch sets.

4. The switching network as claimed in claim 1, wherein means are provided giving each of said inputs access to each of said sets and each of said inputs access to each of said outputs.

5. A switching network having a plurality of inputs and a plurality of outputs,
said outputs arranged in a plurality of sets,
link means for connecting each of said inputs with any of said output sets, and
said link means comprising a plurality of cascaded switches arranged in an input switching stage cascaded with an output switching stage,
first rotary switches included in said input switching stage,
second rotary switches included in said second output switching stage,
means for giving said first rotary switches access to said second rotary switches, and
means for giving said second rotary switch access to said outputs,
a control circuit operated responsive to signals received over said input for determining the wanted one of said sets,
means in said control circuit for determining the availability of said outputs in said wanted set, and
for determining the availability of the links giving access to said wanted set,
means in said control circuit for indicating at least one available output in said wanted set, and
means responsive to said indication for connecting said input over which such signals are received in said available output over said available link.

6. A switching network having a plurality of inputs and a plurality of outputs,
said outputs arranged in $m$ number of output sets,
link means for connecting each of said inputs with any of said outputs,
said link means comprising a plurality of cascaded switches,
said cascaded switches arranged in an input switching stage cascaded with an output switching stage,
there being $n$ number of said switching sets,
a control circuit operated responsive to input signals received over said input for determining the wanted one of said output sets,
said control circuit including a registering device,
said registering device having $m$ number of first output leads corresponding to said $m$ number of output sets,
means for actuating each of said first output leads responsive to said input signal indicating an output of one of said corresponding output sets that is wanted,
said registering device including a first counter,
said first counter having $n$ second output leads, corresponding to $n$ number of switching sets,
means for actuating said $n$ second output leads responsive to a particular condition of said counter,
said control circuit including a matrix of four-input coincident gates,
said matrix having $m$ rows and at most $n$ column of said four-input coincident gates,
means for coupling the first inputs of the gates of the $m$ rows of said matrix to a respective one of said $m$ first output leads,
means for coupling the second inputs of the gates of the said $n$ columns to a respective one of the said $n$ second output leads,
first mixer means,
means for coupling the third inputs of each of said $n$ columns to the output of said first mixer,
means for conditioning said first mixer responsive to the availability condition of the said links which give access to the respective one of said $n$ switch sets,
second mixer means,
means for coupling the fourth inputs of each of said gates to the output of said second mixer means,
means for conditioning the second mixer means responsive to the availability condition of the outputs belonging to the respective one of said $m$ first set, and giving access to the respective one of said $n$ second sets,
third mixer means,
means for coupling the outputs of said gate to the inputs of said third mixer means,
means for coupling the output of said third mixer means to said first counter means responsive to the energization of the output of said third mixer means for stopping said first counter,
means including said gates for determining the availability of said outputs in said wanted set, and
for determining the availability of the links giving access to said wanted set,
for determining the availability of the links giving access to said wanted set,
means in said control circuit for indicating at least one available output in said wanted set, and
means responsive to said indication for connecting said input over which said input signals were received and said available output over said available link.

7. The switching network of claim 6 wherein said control circuit includes a second counter for successively checking the availability of said registering device, and means operated responsive to finding an unavailable registering device for stopping said second counter and for starting said first counter, means for transmitting information from said first counter to said busy register device, means responsive to the stopping of said first counter and the transmittal for starting said second counter.

References Cited

UNITED STATES PATENTS

| | | | |
|---|---|---|---|
| 3,234,335 | 2/1966 | Keister | 179—18 |
| 3,349,189 | 10/1967 | Van Bosse. | |

KATHLEEN H. CLAFFY, *Primary Examiner.*

LAURENCE A. WRIGHT, *Assistant Examiner.*